(12) United States Patent
Voigt et al.

(10) Patent No.: US 7,913,786 B2
(45) Date of Patent: Mar. 29, 2011

(54) BATTERY MOUNTING SYSTEM

(75) Inventors: Derik T. Voigt, Dublin, OH (US); Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 612 days.

(21) Appl. No.: 11/668,251

(22) Filed: Jan. 29, 2007

(65) Prior Publication Data
US 2008/0078597 A1 Apr. 3, 2008

Related U.S. Application Data

(60) Provisional application No. 60/827,456, filed on Sep. 29, 2006.

(51) Int. Cl.
*B60R 16/04* (2006.01)
*B60R 7/00* (2006.01)

(52) U.S. Cl. .................... 180/68.5; 224/902; 224/547

(58) Field of Classification Search ............... 180/68.5; 224/902, 547
See application file for complete search history.

(56) References Cited

U.S. PATENT DOCUMENTS

| | | | |
|---|---|---|---|
| 1,382,980 A * | 6/1921 | Hunt | 180/68.5 |
| 1,465,660 A * | 8/1923 | Alborn | 180/68.5 |
| 1,993,893 A | 3/1935 | Page, Jr. | |
| 2,360,056 A * | 10/1944 | Heitshu | 180/68.5 |
| 2,548,256 A | 4/1951 | Deo | |
| 2,551,990 A * | 5/1951 | Horace | 429/96 |
| 2,849,074 A * | 8/1958 | Key et al. | 180/68.5 |
| 3,821,997 A | 7/1974 | Sieren | |
| 3,821,998 A * | 7/1974 | Hollins | 180/68.5 |
| 3,903,981 A | 9/1975 | Peterson | |
| 3,930,552 A | 1/1976 | Kunkle et al. | |
| 3,989,118 A | 11/1976 | Hansen | |
| 4,013,136 A | 3/1977 | Fear | |
| 4,258,816 A | 3/1981 | Klink | |
| 4,317,497 A * | 3/1982 | Alt et al. | 180/68.5 |
| 4,327,809 A * | 5/1982 | Fenstermaker | 180/68.5 |
| 4,480,710 A | 11/1984 | Hansen | |
| 4,538,697 A * | 9/1985 | Muroi et al. | 180/68.4 |
| 4,754,827 A * | 7/1988 | Hirabayashi | 180/68.5 |
| 5,052,198 A * | 10/1991 | Watts | 70/58 |
| 5,301,765 A | 4/1994 | Swanson | |
| 5,305,513 A | 4/1994 | Lucid et al. | |
| 5,343,974 A | 9/1994 | Rabek | |
| 5,536,595 A * | 7/1996 | Inkmann et al. | 429/120 |
| 5,760,569 A | 6/1998 | Chase, Jr. | |
| 6,050,358 A * | 4/2000 | Kays et al. | 180/294 |
| 6,224,998 B1 * | 5/2001 | Brouns et al. | 429/100 |

(Continued)

FOREIGN PATENT DOCUMENTS

JP 61135841 A * 6/1986

(Continued)

*Primary Examiner* — Terrell Mckinnon
*Assistant Examiner* — Chiedu A Chibogu
(74) *Attorney, Agent, or Firm* — Mark E. Duell; Michael A. Forhan; Eley Law Firm Co.

(57) ABSTRACT

A battery mounting system includes a generally planar mounting base having at least one slot. The system further includes a generally planar battery tray containing a battery and having at least one guide extending away from a bottom surface of the battery tray. The battery tray slidably engages the mounting base such that the guide engages the slot, the guide and slot cooperating to control the travel of the battery tray with respect to the mounting base.

22 Claims, 9 Drawing Sheets

U.S. PATENT DOCUMENTS

| | | | |
|---|---|---|---|
| 6,593,027 B1 * | 7/2003 | Osterhart et al. | 429/96 |
| 6,622,809 B2 | 9/2003 | Takahashi | |
| 6,827,169 B1 * | 12/2004 | Van Hout et al. | 180/68.5 |
| 2004/0079570 A1 * | 4/2004 | Mizuta | 180/68.5 |
| 2005/0092536 A1 | 5/2005 | Takeda | |
| 2005/0274556 A1 | 12/2005 | Chaney | |

FOREIGN PATENT DOCUMENTS

| | | | |
|---|---|---|---|
| JP | 05179980 A | * | 7/1993 |
| JP | 05185885 A | * | 7/1993 |

* cited by examiner

BATTERY MOUNTING SYSTEM

This application claims priority to U.S. provisional application 60/827,456, filed Sep. 29, 2006, the contents of which are hereby incorporated by reference.

FIELD

The present invention relates generally to battery mounts for vehicles, in particular a system to facilitate mounting a battery within a constricted space.

BACKGROUND

Batteries are typically installed into a vehicle using a vertical "drop-in" method wherein the battery is lowered directly into a fixed battery mount and clamped into position. However, engine compartments are becoming increasingly crowded in new vehicle designs, driving a need for the final set position of the battery to be at least partially underneath other components within the engine compartment in order to maintain desired clearances between the battery and other objects. Such positioning cannot accommodate vertical drop-in installation or replacement of the battery. Consequently, it is necessary to maneuver the battery both vertically and laterally.

Others have attempted to facilitate installation of a battery into a constricted space within a vehicle. For example, vehicle battery mounts that are pivotable between an installed position and a service position have been devised, such as those disclosed in U.S. Pat. No. 4,480,710 to Hansen and U.S. Pat. No. 4,013,136 to Fear. In addition, battery mounts that are slidable on tracks or guides have been attempted, as in U.S. Pat. No. 5,760,569 to Chase, Jr., U.S. Pat. No. 3,989,118 to Hansen and U.S. Pat. No. 1,993,893 to Page, Jr. However, none of the current movable battery mounts facilitate vertical drop-in mounting of a battery that is ultimately located at least partially underneath structural components of the vehicle.

SUMMARY

A battery mounting system according to an embodiment of the present invention allows for vertical drop-in installation of a battery onto a battery tray, followed by lateral sliding movement of the tray to move the battery to an installed position. The battery tray has locating guides that engage corresponding slots of a battery mounting base assembled to the body or frame. The guides and slots cooperate to control the orientation of the battery as well as its range of movement, thereby maintaining desired clearances between the battery and nearby vehicle components. In use, the battery tray is first slidably moved to a service position that allows a battery to be vertically dropped into the tray. The battery and tray are then slidably moved to an installed position, which may locate the battery at least partially underneath other components of the vehicle, such as a portion of a fender. A battery sleeve may optionally be joined to the battery tray to protect the battery from engine heat. Finally, a set plate is installed to secure the battery to the tray and to fix the battery and tray in their final, set position.

One object of the invention is a battery mounting system that comprises a generally planar mounting base, the mounting base having at least one slot. The system further includes a generally planar battery tray containing a battery and having at least one guide extending away from a bottom surface of the battery tray. The battery tray slidably engages the mounting base such that the guide engages the slot, the guide and slot cooperating to control the travel of the battery tray with respect to the mounting base.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
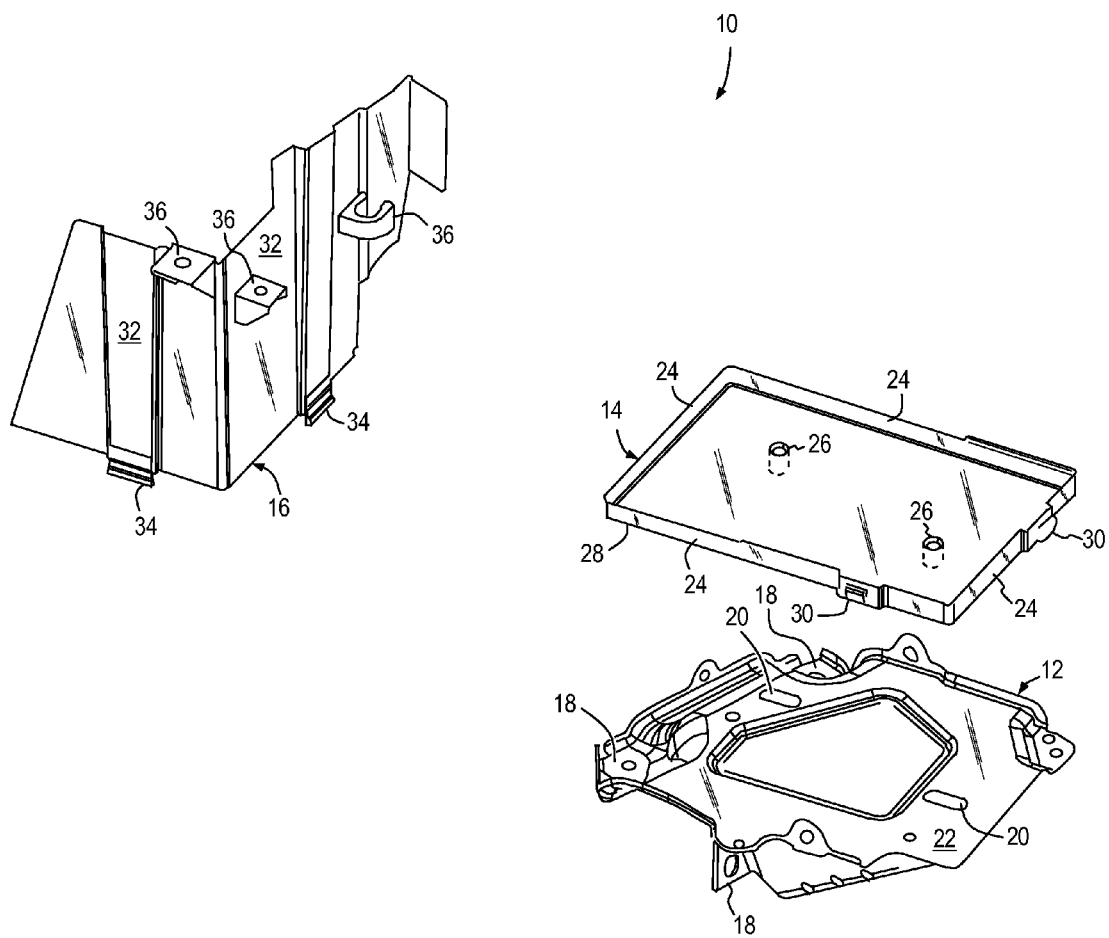
FIG. 1 is an exploded view of a battery mounting system according to an embodiment of the present invention.
Figure 2A:
FIG. 2A is a front elevational view of a battery tray according to an embodiment of the present invention.
Figure 2B:
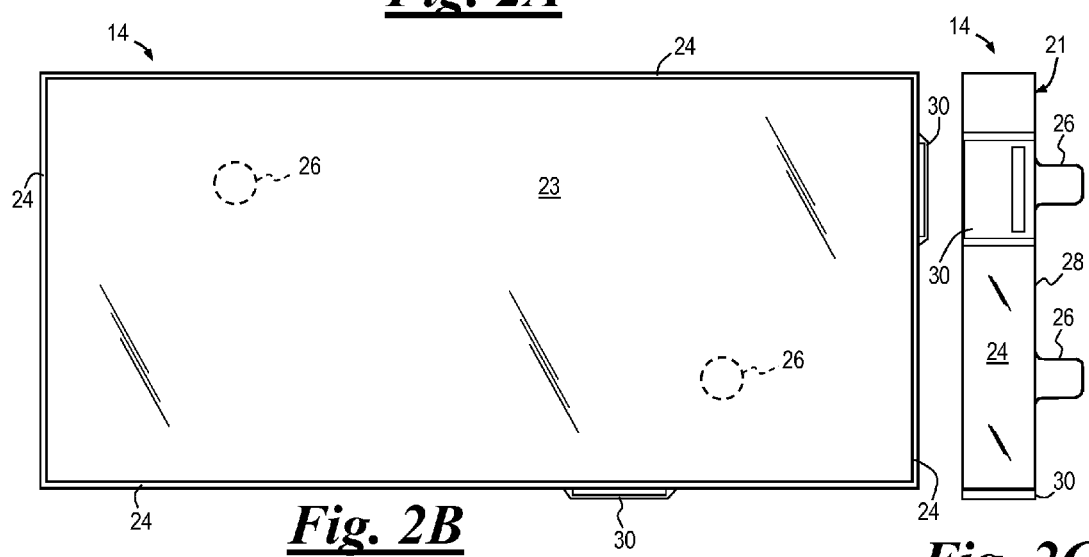
FIG. 2B is a top plan view of the battery tray of FIG. 2A.
Figure 2C:
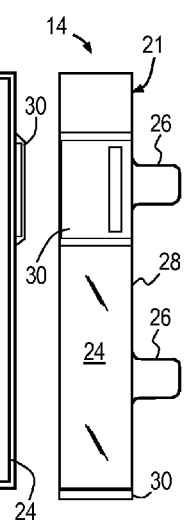
FIG. 2C is an end view of the battery tray of FIG. 2A.
Figure 2D:
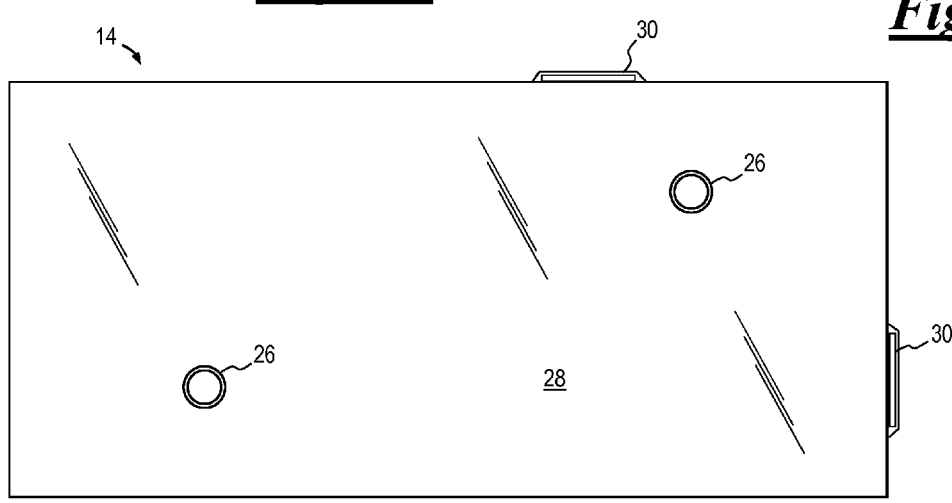
FIG. 2D is a bottom plan view of the battery tray of FIG. 2A.

The general arrangement of a battery mounting system 10 is shown in FIG. 1 according to an embodiment of the present invention. Battery mounting system 10 comprises a mounting base 12, a battery tray 14 and a sleeve 16.

Figure 3A:
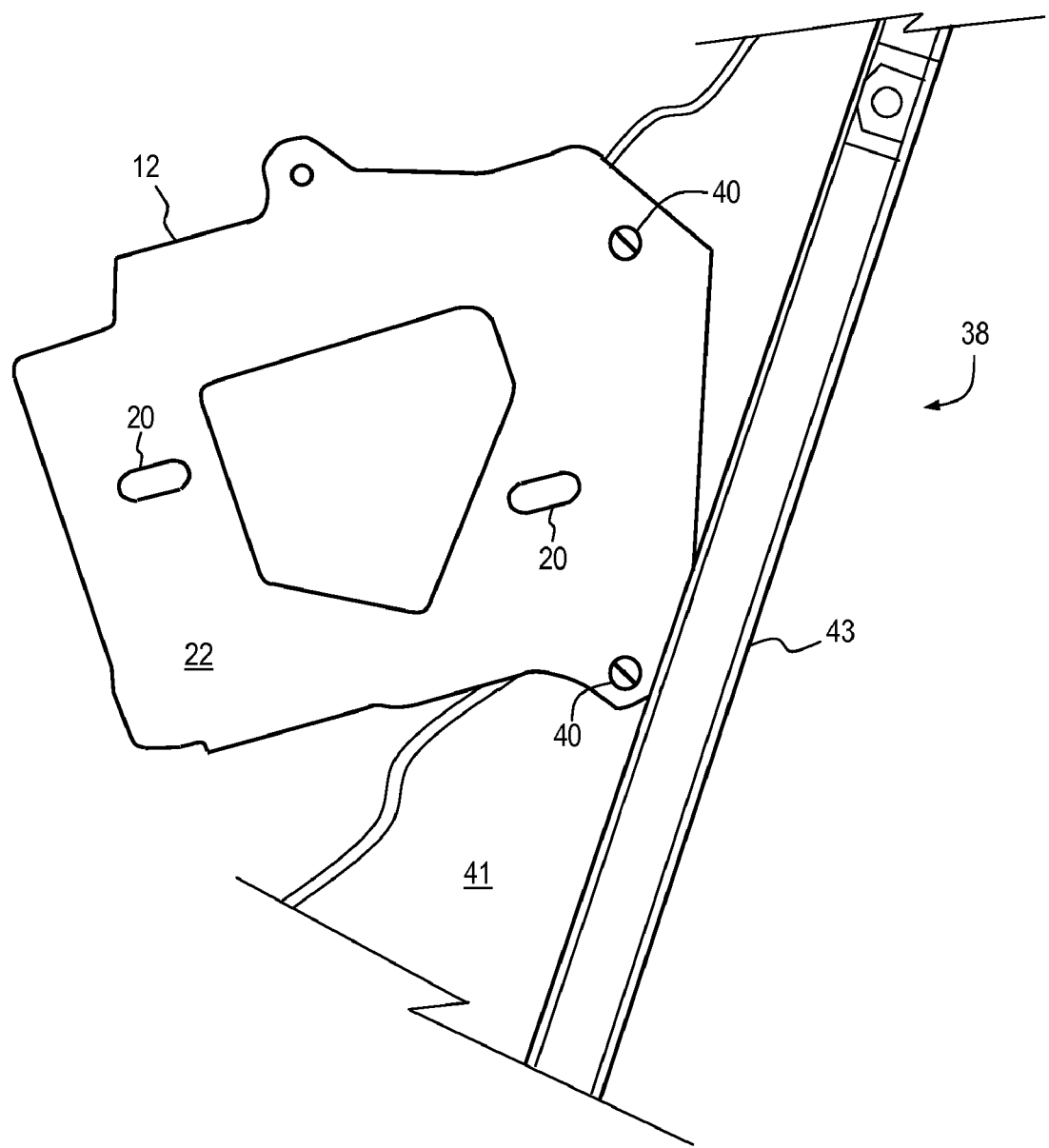
FIG. 3A is a top plan view of a battery mounting base installed to a vehicle structure according to an embodiment of the present invention.

Mounting base 12 is a generally planar structural member configured to be attached to complementary structural members of a vehicle, such as the body or frame, in any conventional manner including, without limitation, fasteners through openings in one or more mounting tabs as at 18, welding, adhesive, or any combination thereof. Mounting base 12 further includes one or more linear slots 20. As can be seen in FIGS. 1 and 3A, slots 20 are "closed slots" in that their peripheries are entirely bounded by surrounding material of mounting base 12, as contrasted with an "open slot" which has an unbounded portion that is contiguous with an edge. Slots 20 may be oriented such that their longitudinal axes are generally parallel with one another, although other orientations may be suitable for other configurations. In addition, slots 20 have a predetermined length and orientation on a planar surface 22 of mounting base 12 to control the travel of battery tray 14 with respect to the mounting base, as will be further detailed below.

Mounting base 12 and its associated features may be made from any material suitable for use with battery mounting system 10 and the expected environment including, without limitation, metal, plastic and composites. In addition, mounting base 12 and its associated features may be formed in any conventional manner including, but not limited to, casting, machining, forming, molding, stamping and spinning. Furthermore, mounting base 12 and its associated features may be finished in any conventional manner, such as painting, coating or plating, or may be left unfinished.

With reference now to FIGS. 1, 2A, 2B, 2C and 2D in combination, battery tray 14 includes a generally planar floor 21 having an upper surface 23 and further includes a plurality of upwardly-extending sidewalls 24 to generally surround and retain the lower portion of a battery placed into the battery tray. Battery tray 14 further includes at least one guide 26 extending away from a bottom surface 28 of floor 15 of the tray. Battery tray 14 may also include at least one receptacle 30 to which sleeve 16 may be joined.

Guides 26 are generally cylindrical, having a diameter sized to slidably fit into slots 20 of mounting base 12, and having a length sufficient to fully engage the slots. In other embodiments guides 20 may have non-cylindrical shapes including, without limitation, square and polygonal shapes. Guides 26 may be integrally formed with battery tray 14 or may be made separately and attached to the battery tray in any conventional manner, such as with fasteners, adhesive and welding.

Receptacles 30 are configured to detachably engage a correspondingly-shaped tab of sleeve 16 inserted therein. In other embodiments receptacles 30 may be configured to detachably engage a tab in any alternate conventional manner including, but not limited to, fasteners. Receptacles 30 may be integrally formed with battery tray 14 or may be made separately and attached to the battery tray in any conventional manner, such as with fasteners, adhesive and welding.

Battery tray 14 and its associated features may be made from any material suitable for use with battery mounting system 10 and the expected environment including, without limitation, metal, plastic and composites. In addition, battery tray 14 and its associated features may be formed in any conventional manner including, but not limited to, casting, machining, forming, molding, stamping and spinning. Furthermore, battery tray 14 and its associated features may be finished in any conventional manner, such as painting, coating or plating, or may be left unfinished.

With continued reference to FIG. 1, sleeve 16 comprises one or more vertically-oriented walls 32. The embodiment shown in FIG. 1 depicts a generally L-shaped sleeve 16 having a pair of walls 32, although a greater or fewer number of walls are envisioned. Sleeve 16 may also include one or more tabs 34 configured to engage receptacles 30 of battery tray 14. Tabs 34 may be integrally formed with sleeve 16 or may be made separately and attached to the sleeve in any conventional manner, such as with fasteners, adhesive and welding.

Sleeve 16 may further include at least one bracket 36 configured to receive a fastener to secure the sleeve and/or serve as a mounting point for various ancillary items, such as wiring, which may or may not be related to battery mounting system 10. Brackets 36 may be integrally formed with sleeve 16 or may be made separately and attached to the sleeve in any conventional manner, such as with fasteners, adhesive and welding.

Sleeve 16 and its associated features may be made from any material suitable for use with battery mounting system 10 and the expected environment including, without limitation, metal, plastic and composites. In addition, sleeve 16 and its associated features may be formed in any conventional manner including, but not limited to, casting, machining, forming, molding, stamping and spinning. Furthermore, sleeve 16 and its associated features maybe finished in any conventional manner, such as painting, coating or plating, or may be left unfinished.

In operation, mounting base 12 is installed to a vehicle 38 in any conventional manner, such as with fasteners 40 installed through mounting tabs 18 and into one or more structural members 41 of the vehicle, as shown in FIG. 3A. Mounting base 12 may include additional support and brace structures (not shown) to further secure the mounting base to the vehicle. Details of such structures, which are available in the art, have been omitted for the sake of clarity.

Figure 3B:
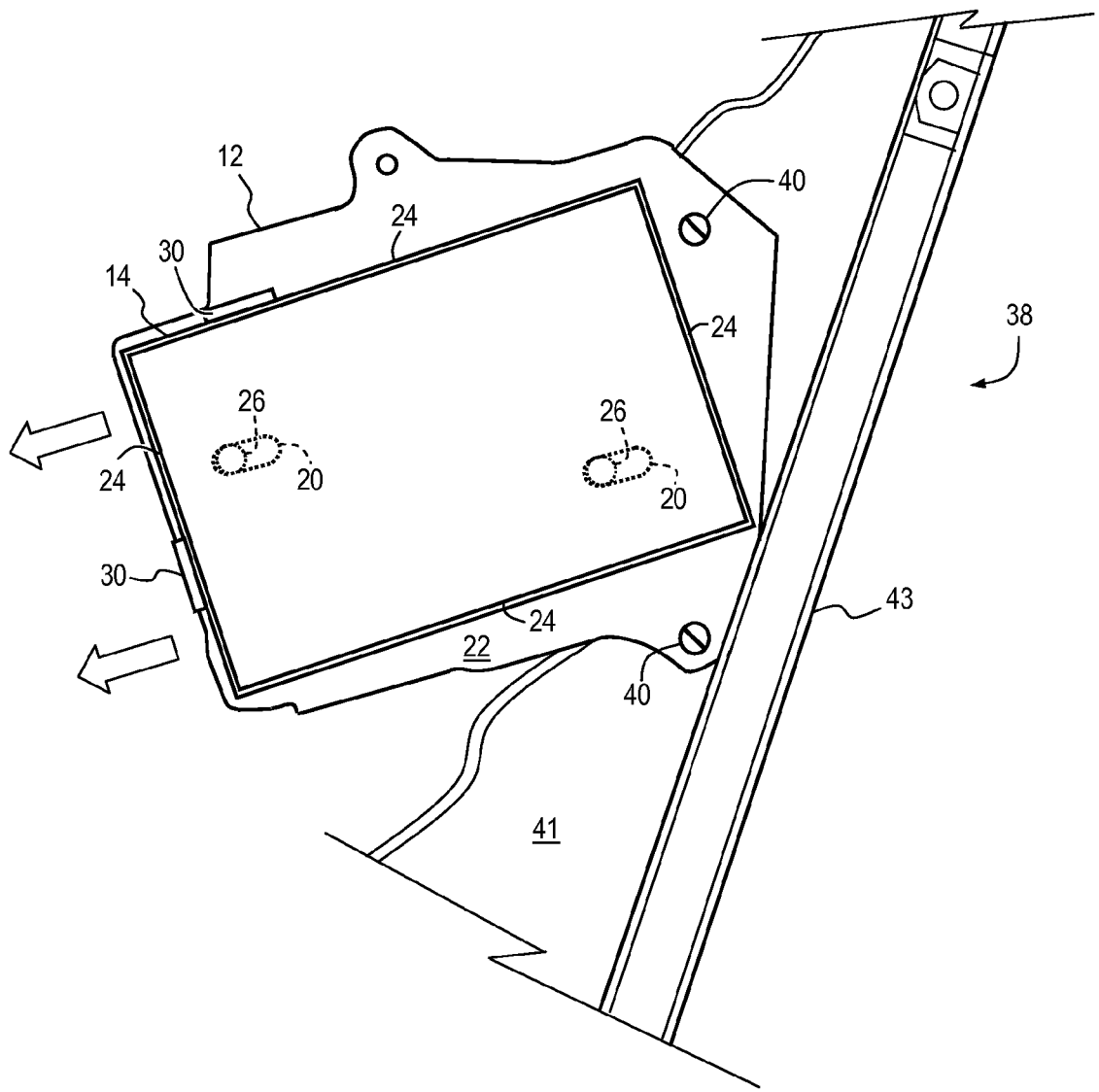
FIG. 3B is a top plan view of a battery tray being installed to the mounting base of FIG. 3A at a service position according to an embodiment of the present invention.

Battery tray 14 is located over mounting base 12 and placed atop the mounting base such that guides 26 freely engage corresponding slots 20, as shown in FIG. 3B. That is, battery tray 14 is not secured to mounting base 12 by guides 26 and is thus freely movable toward and away from the mounting base, as can be appreciated by additional reference to FIG. 1. Battery tray 14 is moved slidably with respect to mounting base 12 to a service position such that the battery tray is vertically unobstructed by nearby vehicle structures such as a component 43 of vehicle 38, as also shown in FIG. 3B. The directions and limits of the slidable travel of battery tray 14 with respect to mounting base 12 is controlled by slots 20 in cooperation with guides 26.

Figure 3C:
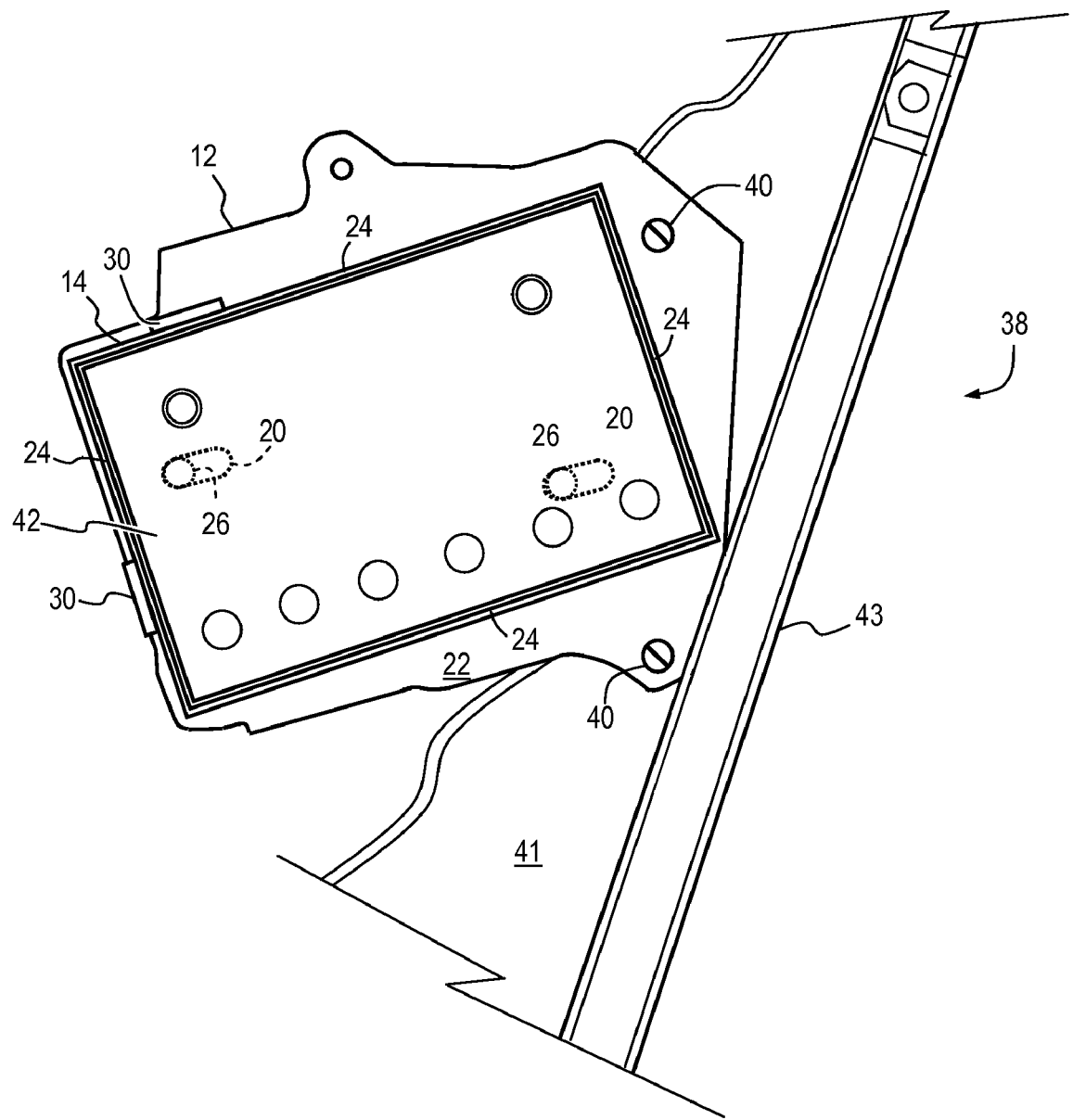
FIG. 3C is a top plan view of a battery installed to the battery tray of FIG. 3B at a service position according to an embodiment of the present invention.
Figure 3D:
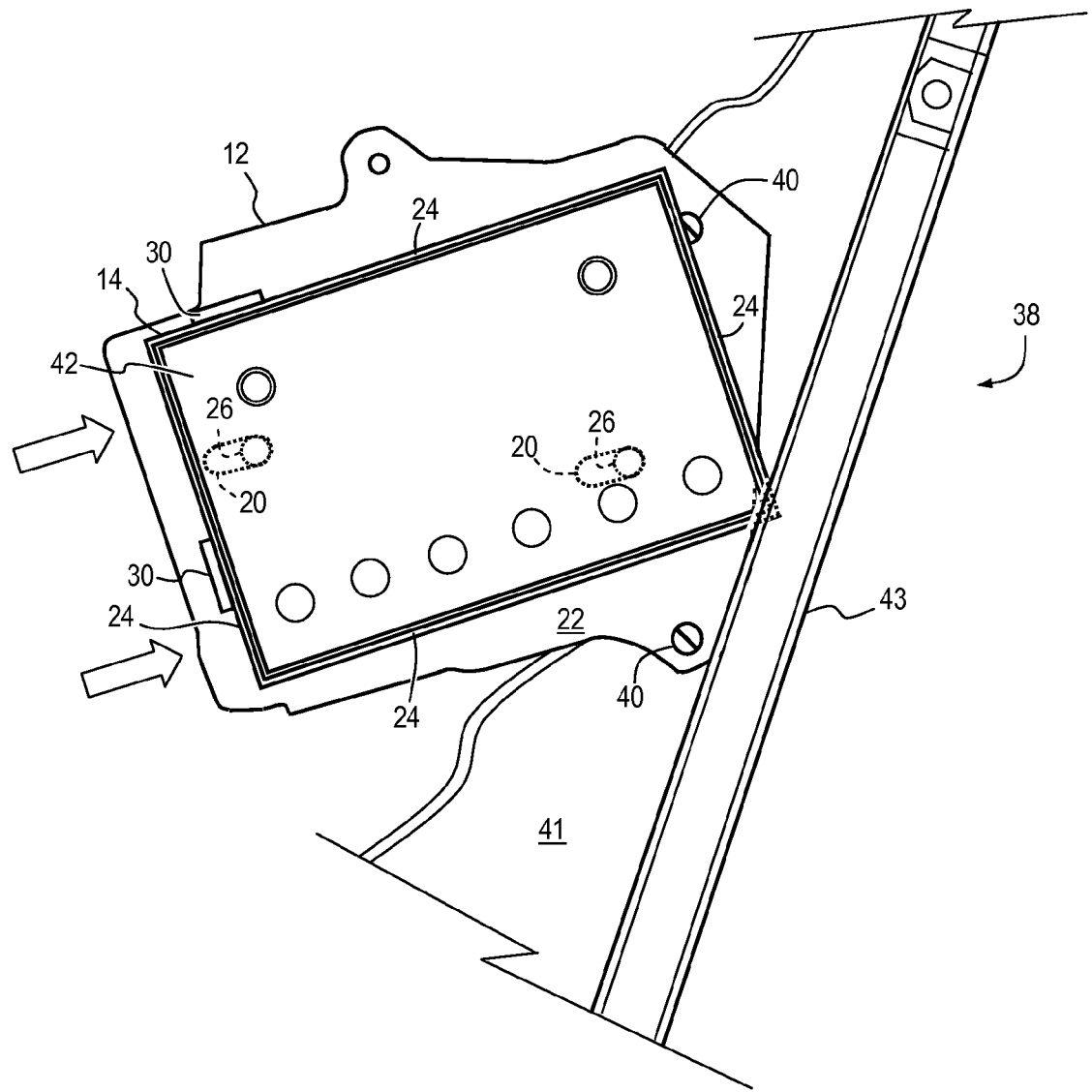
FIG. 3D is a top plan view of the assembly of FIG. 3C being moved to an installed position according to an embodiment of the present invention.
Figure 3E:
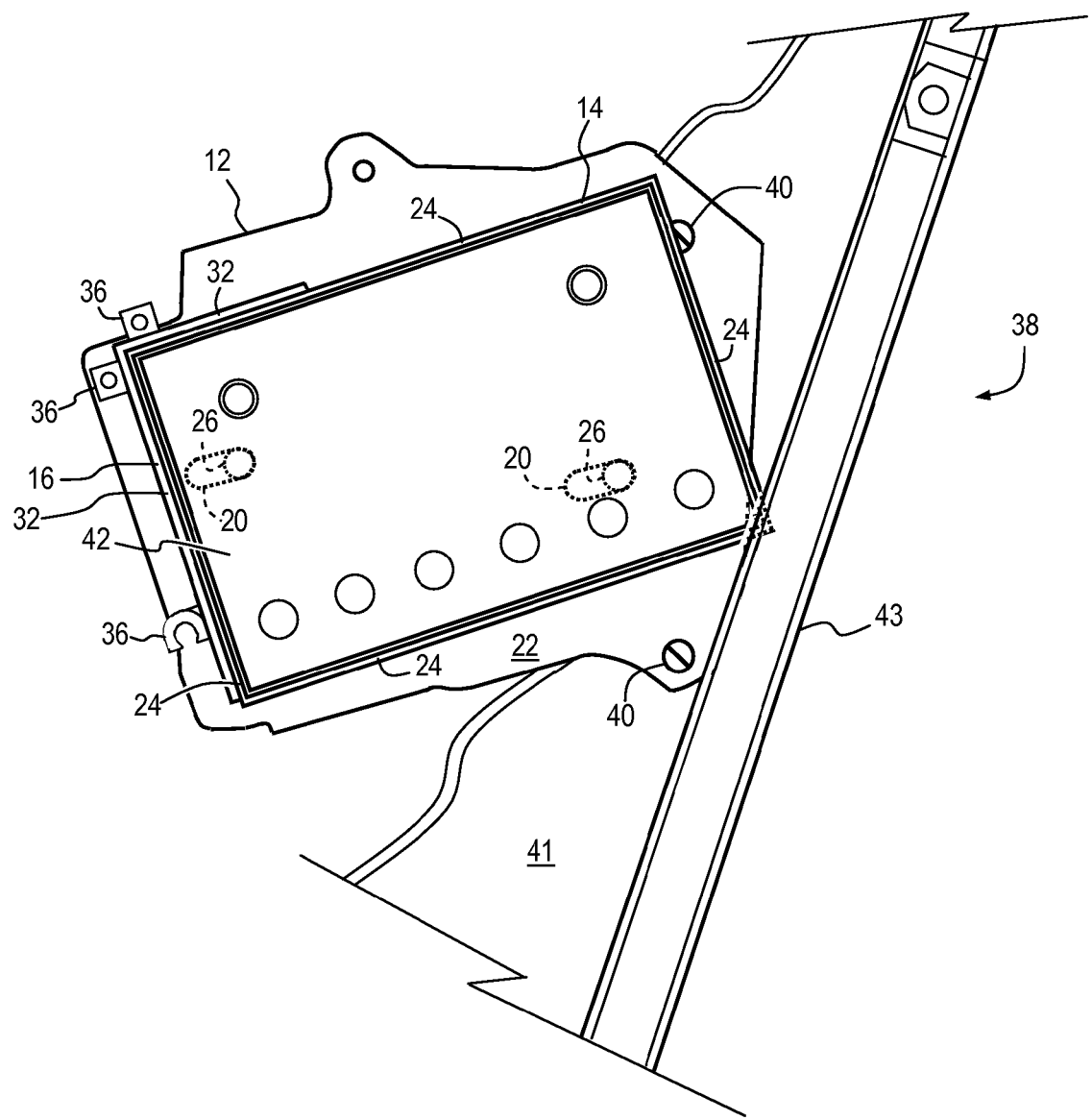
FIG. 3E is a top plan view of a sleeve being installed to the battery tray of FIG. 3C according to an embodiment of the present invention.

A battery 42 is vertically placed onto upper surface 23 of battery tray 14 (FIG. 2B), the battery being retained by sidewalls 24 (FIG. 1) of the tray, as shown in FIG. 3C. Battery tray 14 is then moved slidably laterally with respect to mounting base 12 to an installed position such that battery 42 may be at least partially underneath a component 43 of vehicle 38, as shown in FIG. 3D. Sleeve 16 is then installed to battery tray 14 by engaging tabs 34 of the sleeve to corresponding receptacles 30 of the battery tray, as in FIGS. 1 and 3E. Sleeve 16 aids to protect battery 42 from heat generated by nearby engine components, such as the vehicle's engine.

Figure 3F:
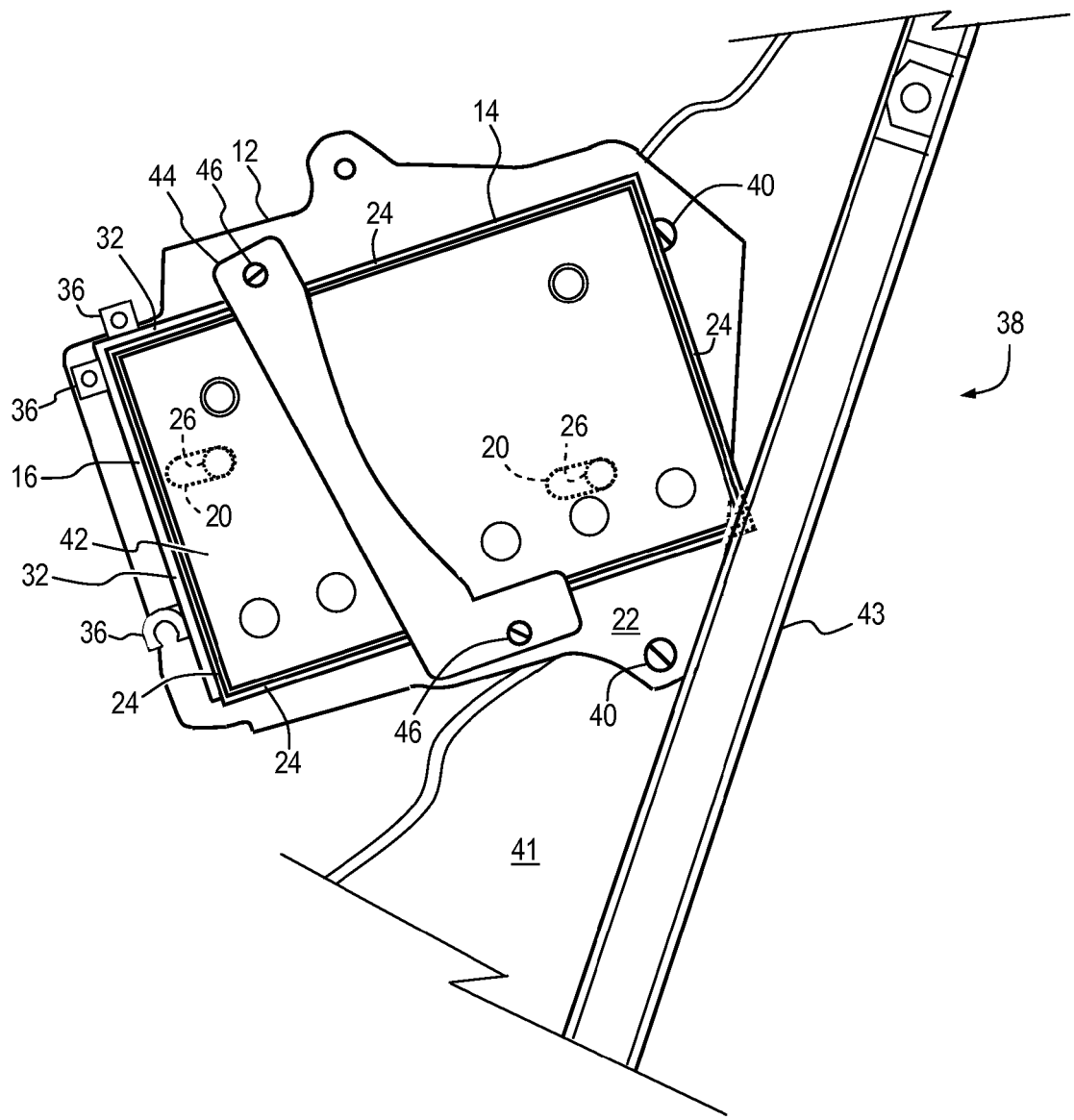
FIG. 3F is a top plan view of a set plate being installed to the mounting base of FIG. 3A to secure a battery according to an embodiment of the present invention.

Lastly, a bracket such as set plate 44 is installed atop battery 42 and coupled to mounting base 12 in any conventional manner, such as with fasteners 46, to secure the battery as shown in FIG. 3F. Set plate 44 may be made from any material suitable for use with battery mounting system 10 and the expected environment including, without limitation, metal, plastic and composites. In addition, set plate 44 may be formed in any conventional manner including, but not limited to, casting, machining, forming, molding, stamping and spinning. Furthermore, set plate 44 may be finished in any conventional manner, such as painting, coating or plating, or may be left unfinished. Set plate 44 may also include a padded material (not shown), such as rubber, between the set plate and battery 42 to prevent wearing between the battery and the set plate due to vibration experienced when vehicle 38 is in operation.

Removal of battery 42 from vehicle 38 is accomplished by generally reversing the steps of the installation procedure, described above in detail with reference to FIGS. 3A-3F. Accordingly, the steps for removing battery 42 from vehicle 38 will not be further detailed herein.

The embodiments of the present invention detailed above and shown in the accompanying figures describe linear slots 20 in mounting base 12 oriented such that their longitudinal axes are generally parallel with one another. However, in various alternate embodiments of the present invention the slots 20 may have a predetermined pattern and/or may be non-parallel with respect to each other. As a non-limiting example, arced or curved slots 20 may be utilized to define the travel of battery tray 14 with respect to mounting base 12 when being moved to and from the service and installed positions. Similarly, divergent or convergent slots 20 may be utilized to define slidable and/or pivotable travel of battery tray 14 with respect to mounting base 12 when being moved to and from the service and installed positions. Furthermore, slots 20 may be formed with any combination of parallel portions, non-parallel portions, curved portions, patterns and stops that define the travel of battery tray 14 with respect to mounting base 12 in a predetermined manner.

Figure 4:
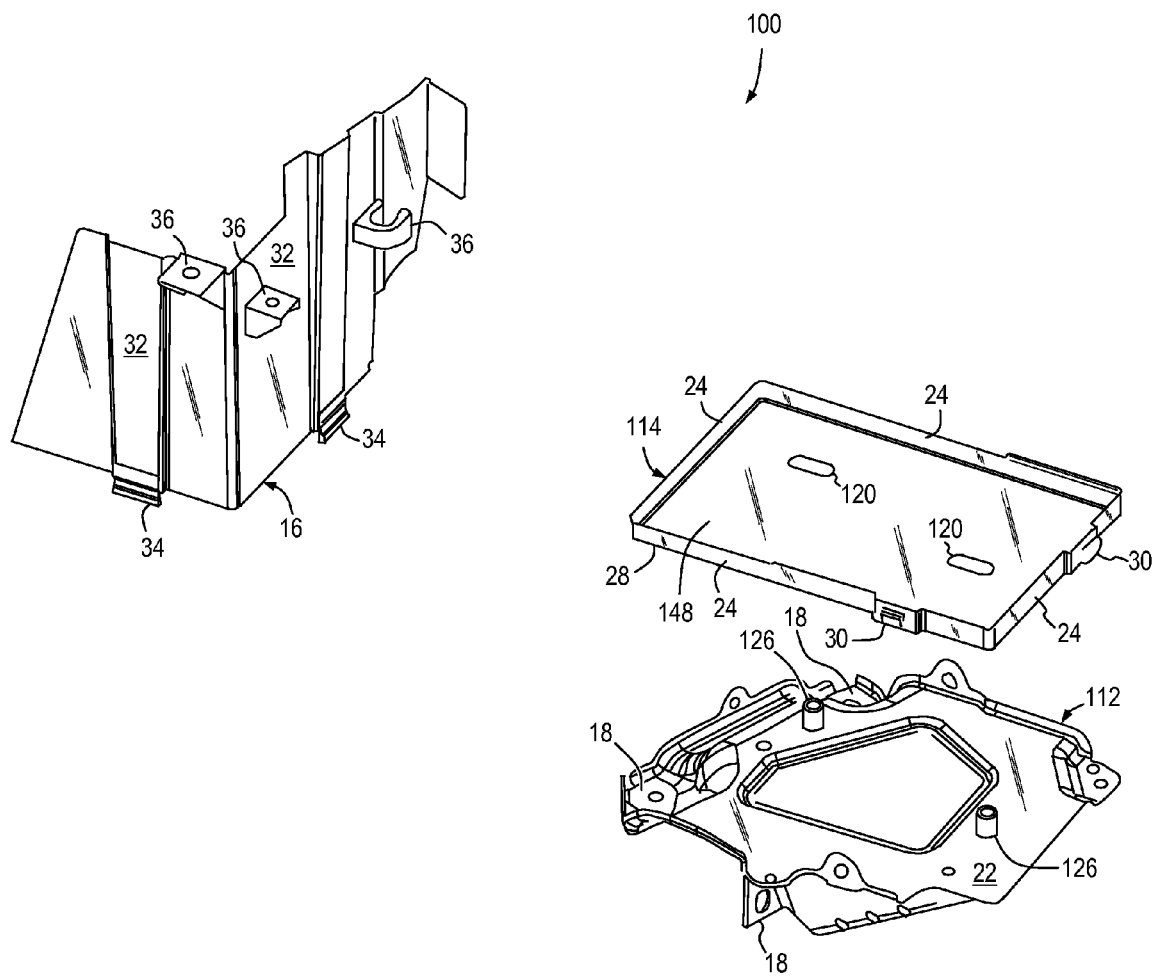
FIG. 4 is an exploded view of a battery mounting system according to an alternate embodiment of the present invention.

With reference to FIG. 4, in other alternate embodiments of the present invention a battery mounting system 100 may be realized wherein one or more slots 120 are formed in a planar floor 148 of a battery tray 114 and corresponding guides 126 are formed in a mounting base 112. In such embodiments the slots 120 may extend through planar floor 148 of the battery tray, the planar floor being of sufficient thickness to engage guides 126 of the mounting base without interfering with the seating of a battery on the battery tray. Alternatively, slots 120 may be formed as cavities in planar floor 148, the cavities having openings at bottom surface 28 configured to engage corresponding guides 126 of the mounting base. The structure and function of the components of battery mounting system 100 are otherwise unchanged from that of battery mounting system 10 and thus will not be repeated herein.

While this invention has been shown and described with respect to a detailed embodiment thereof, it will be understood by those skilled in the art that changes in form and detail thereof may be made without departing from the scope of the claims of the invention. For example, it will be appreciated that sleeve 16 may be deleted in some embodiments of battery mounting systems 10 and 100 for vehicle configurations that do not require heat shielding for the battery, or which provide some other means of heat shielding separate from the battery mounting system.

What is claimed is:

1. A battery mounting system, comprising:
   a generally horizontal mounting base, the mounting base including a generally planar top surface;
   at least two generally horizontal, closed slots formed in the mounting base;
   a battery tray for containing a battery, the battery tray having a generally horizontal, planar floor, the floor further including an upper surface and an opposing bottom surface, the upper surface of the floor being sized and shaped to receive the battery; and
   at least two guides protruding from and extending vertically away from the bottom surface of the floor of the battery tray, the at least two guides each being a unitary member and in spacial correspondence with the at least two closed slots,
   the bottom surface of the floor of the battery tray being selectably facially adjacent to and slidably contacting the top surface of the mounting base such that each one of the at least two guides of the battery tray freely engages a corresponding one of the at least two closed slots of the mounting base, the at least two guides and the at least two closed slots each cooperating to allow slidable, lateral adjustment of the position of the battery tray with respect to the mounting base, the orientation and range of movement of the battery tray with respect to the mounting base being controlled by the dimensions of the at least two closed slots in cooperation with each of the at least two guides located therein,
   the battery tray remaining unsecured to the mounting base by the guides following the engagement of the guides with the slots.

2. The battery mounting system of claim 1 wherein the battery tray further comprises a plurality of upwardly-extending sidewalls to retain the battery.

3. The battery mounting system of claim 1, further comprising a sleeve detachably engageable to the battery tray.

4. The battery mounting system of claim 3 wherein:
   the battery tray further comprises at least one receptacle; and
   the sleeve further comprises at least one tab, the at least one tab being configured to detachably engage the at least one receptacle to detachably engage the sleeve to the battery tray.

5. The battery mounting system of claim 3 wherein the sleeve is generally L-shaped.

6. The battery mounting system of claim 3 wherein the sleeve further comprises at least one bracket for mounting ancillary items.

7. The battery mounting system of claim 1, further comprising a set plate detachably engageable to the mounting base and the battery to secure the battery.

8. The battery mounting system of claim 1 wherein the at least two closed slots are at least one of linear, curved and arced.

9. The battery mounting system of claim 1, wherein the at least two closed slots are at least one of longitudinally parallel to one another, convergent and divergent.

10. The battery mounting system of claim 1 wherein the at least two guides have at least one of a cylindrical, square and polygonal shape.

11. A battery mounting system, comprising:
    a generally horizontal mounting base, the mounting base including a generally planar top surface;
    a pair of generally horizontal, closed, linear slots formed in the mounting base, the pair of closed linear slots being generally longitudinally parallel to one another;
    a battery tray for containing a battery, the battery tray having a generally horizontal, planar floor, the floor further including an upper surface and an opposing bottom surface, the upper surface of the floor being sized and shaped to receive the battery, the battery tray further including a plurality of upwardly-extending sidewalls to retain the battery;
    a pair of guides protruding from and extending vertically away from the bottom surface of the floor of the battery tray, the pair of guides each being a unitary member and in spacial correspondence with the pair of closed linear slots,
    a generally L-shaped sleeve detachably engaged to the battery tray; and
    a set plate for detachably engaging the mounting base and the battery to secure the battery,
    the bottom surface of the floor of the battery tray being selectably facially adjacent to and slidably contacting the top surface of the mounting base such that each one of the pair of guides of the battery tray freely engages a corresponding one of the pair of closed linear slots of the mounting base, the pair of guides and the pair of closed linear slots each cooperating to allow slidable, lateral adjustment of the position of the battery tray with respect to the mounting base, the orientation and range of movement of the battery tray with respect to the mounting base being controlled by the dimensions of each of the pair of closed linear slots in cooperation with each of the corresponding pair of guides located therein,
    the battery tray remaining unsecured to the mounting base by the guides following the engagement of the guides with the slots.

12. A method for mounting a battery, comprising the steps of:
   providing a battery;
   fabricating a generally horizontal mounting base, the mounting base including a generally planar top surface;
   forming at least two generally horizontal, closed slots in the mounting base;
   affixing the mounting base to a complementary structure of a vehicle;
   fabricating a battery tray for containing the battery, the battery tray having a generally horizontal, planar floor, the floor further including an upper surface and an opposing bottom surface, the upper surface of the floor being sized and shaped to receive the battery, the battery tray further including at least two guides protruding from and extending vertically away from the bottom surface of the floor of the battery tray, the at least two guides each being a unitary member and in spacial correspondence with the at least two closed slots;
   mounting the battery to the battery tray; and
   placing the bottom surface of the floor of the battery tray selectably facially adjacent to the mounting base and slidably contacting the bottom surface of the battery tray with the top surface of the mounting base such that each one of the at least two guides of the battery tray freely engages a corresponding one of the at least two closed slots of the mounting base,
   the at least two guides and the at least two closed slots each cooperating to allow slidable, lateral adjustment of the position of the battery tray with respect to the mounting base, the orientation and range of movement of the battery tray with respect to the mounting base being controlled by the dimensions of each of the at least two closed slots in cooperation with each of the at least two guides located therein,
   the battery tray remaining unsecured to the mounting base by the guides following the engagement of the guides with the slots.

13. The method of claim 12, wherein the step of fabricating the battery tray further includes forming a plurality of upwardly-extending sidewalls on the battery tray to retain the battery.

14. The method of claim 12, further comprising the step of detachably engaging a sleeve to the battery tray.

15. The method of claim 14, further comprising the step of forming the sleeve in a generally L-shape before engaging the sleeve to the battery tray.

16. The method of claim 12, further comprising the step of detachably engaging a set plate to the mounting base and the battery to secure the battery.

17. The method of claim 12, wherein the at least two closed slots have at least one of a linear, curved and arced shape.

18. The method of claim 12, wherein the at least two closed slots are at least one of longitudinally parallel to one another, convergent and divergent.

19. A battery mounting system, comprising:
   a battery tray for containing a battery, the battery tray including a generally horizontal, planar floor having an upper surface and an opposing bottom surface, the upper surface being sized and shaped to receive the battery;
   at least two generally horizontal, closed slots formed in the battery tray;
   a generally horizontal mounting base, the mounting base having a generally planar top surface; and
   at least two guides protruding from and extending vertically away from the top surface of the mounting base, the at least two guides each being a unitary member and in spacial correspondence with the at least two closed slots,
   the bottom surface of the floor of the battery tray being selectably facially adjacent to and slidably contacting the top surface of the mounting base such that each one of the at least two guides of the mounting base freely engages a corresponding one of the at least two closed slots of the battery tray, the at least two guides and the at least two closed slots each cooperating to allow slidable, lateral adjustment of the position of the battery tray with respect to the mounting base, the orientation and range of movement of the battery tray with respect to the mounting base being controlled by the dimensions of the at least two closed slots in cooperation with each of the at least two guides located therein,
   the battery tray remaining unsecured to the mounting base by the guides following the engagement of the guides with the slots.

20. The battery mounting system of claim 19 wherein the battery tray further comprises a plurality of upwardly-extending sidewalls to retain the battery.

21. The battery mounting system of claim 19, further comprising a sleeve detachably engageable to the battery tray.

22. The battery mounting system of claim 19, further comprising a set plate configured to detachably engage the mounting base and the battery to secure the battery.

* * * * *

UNITED STATES PATENT AND TRADEMARK OFFICE
CERTIFICATE OF CORRECTION

| | | |
|---|---|---|
| PATENT NO. | : 7,913,786 B2 | |
| APPLICATION NO. | : 11/668251 | |
| DATED | : March 29, 2011 | |
| INVENTOR(S) | : Voigt et al. | |

It is certified that error appears in the above-identified patent and that said Letters Patent is hereby corrected as shown below:

Column 4, line 1, "maybe" should read --may be--

Signed and Sealed this
Seventh Day of June, 2011

David J. Kappos
*Director of the United States Patent and Trademark Office*